United States Patent [19]

Kohno

[11] Patent Number: 5,195,613
[45] Date of Patent: Mar. 23, 1993

[54] COMMODITY DATA READER

[75] Inventor: Mitunori Kohno, Shizuoka, Japan

[73] Assignee: Tokyo Electric Co., Ltd., Tokyo, Japan

[21] Appl. No.: 711,106

[22] Filed: Jun. 3, 1991

Related U.S. Application Data

[63] Continuation of Ser. No. 406,603, Sep. 13, 1989, abandoned.

[30] Foreign Application Priority Data

Sep. 20, 1988 [JP] Japan ................................ 63-235434
Sep. 20, 1988 [JP] Japan ................................ 63-235435
Sep. 29, 1988 [JP] Japan ................................ 63-244958

[51] Int. Cl.⁵ .......................... A47F 9/02; G06K 7/10
[52] U.S. Cl. ...................................... 186/59; 186/61; 186/66; 235/383
[58] Field of Search ...................... 186/59, 60, 61, 66; 235/383

[56] References Cited

U.S. PATENT DOCUMENTS

| | | | |
|---|---|---|---|
| 1,510,435 | 9/1924 | Trapp | 52/33 |
| 1,714,745 | 5/1929 | Woerfel | 312/120 X |
| 2,884,094 | 4/1959 | Roy | 186/1 |
| 3,075,616 | 1/1963 | Shoffner | 186/1 |
| 3,076,528 | 2/1963 | Potrafke | 186/68 |
| 3,186,515 | 6/1965 | Potrafke | 186/59 |
| 4,085,822 | 4/1978 | Osborn | 186/1 |
| 4,138,000 | 2/1979 | Hartup | 186/61 |
| 4,369,361 | 1/1983 | Swartz et al. | 235/462 X |
| 4,422,745 | 12/1983 | Hopson | 235/462 X |
| 4,512,540 | 4/1985 | Stroh | 186/61 X |
| 4,572,573 | 2/1986 | Yoshikawa et al. | 297/330 X |
| 4,652,732 | 3/1987 | Nickl | 235/383 X |
| 4,716,281 | 12/1987 | Amacher et al. | 235/383 |
| 4,762,984 | 8/1988 | Knowles et al. | 235/383 |
| 4,789,048 | 12/1988 | Cramer et al. | 186/61 |
| 4,838,383 | 6/1989 | Saito et al. | 186/59 |
| 4,853,521 | 8/1989 | Claeys et al. | 235/462 X |
| 4,938,317 | 7/1990 | Kohno et al. | 186/59 X |
| 4,963,721 | 10/1990 | Kohno et al. | 186/61 X |

FOREIGN PATENT DOCUMENTS

| | | |
|---|---|---|
| 0283241 | 9/1988 | European Pat. Off. |
| 143127 | 10/1902 | Fed. Rep. of Germany |
| 2065630 | 10/1970 | Fed. Rep. of Germany |
| 2218846 | 4/1972 | Fed. Rep. of Germany |
| 50-148040 | 11/1975 | Japan |
| 59-197967 | 11/1984 | Japan |
| 60-205773 | 10/1985 | Japan |
| 61-163572 | 10/1986 | Japan |
| 63-45666 | 3/1988 | Japan |

Primary Examiner—Michael S. Huppert
Assistant Examiner—Scott L. Lowe
Attorney, Agent, or Firm—Oblon, Spivak, McClelland, Maier & Neustadt

[57] ABSTRACT

A commodity data reader comprises a bar-code scanner disposed near the edge of one of the longer sides of an elongated check-out counter on which baskets containing commodities are placed on the side of the operator with the scanning window thereof facing the customer. Commodities are passed for scanning across the scanning window before the customer's eyes. Also, the check-out counter may be provided with a body support for supporting the operator in the belly, to thereby alleviate any fatigue which may be felt by the operator.

7 Claims, 5 Drawing Sheets

FIG.1
FIG.2
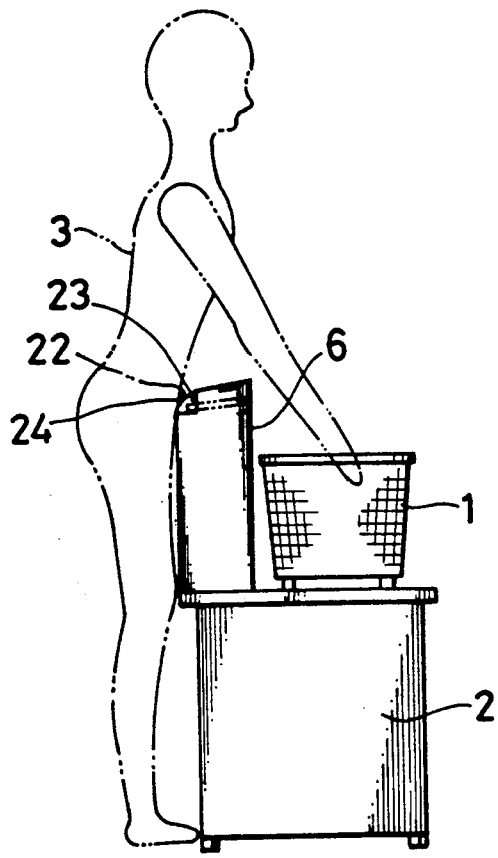
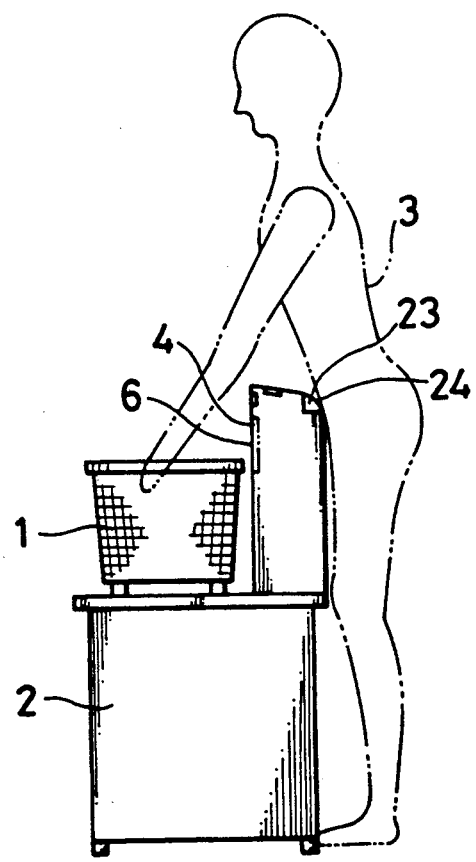

COMMODITY DATA READER

This application is a continuation of application Ser. No. 406,603, filed on Sep. 13, 1989, now abandoned.

FIELD OF THE INVENTION AND RELATED ART STATEMENT

The present invention relates to a commodity data reader provided with a bar-code scanner.

A conventional commodity data reader will be described with reference to FIGS. 8, 9 and 10 prior to the description of the present invention. A bar-code scanner 51 is disposed with the scanning window 50 thereof facing the operator 3 on the far side, in terms of the position of the operator 3, of a check-out counter 2 on which a basket 1 containing commodities is placed. The bar-code scanner 51 reads bar codes put on commodities as the commodities are passed across the scanning window 50. The data of commodities not carrying any bar code or those carrying bar codes which are difficult for the bar-code scanner 51 to read is recorded by operating a keyboard 52.

In reading commodity data by this commodity data reader, the commodities undergo scanning behind the bar-code scanner 51 in terms of the position of the customer. Therefore, the customer inevitably feels uneasy about the possibility of double scanning and wrong check-out, which is undesirable and unpleasant to the customer.

The conventional commodity data reader has only a small space for accommodating various check-out utensils including paper bags of various sizes, waterproof bags for containing wet commodities, sales verification tapes, packaging tapes, straws and spoons, and it is inconvenient for the operator to reach for the check-out utensils because the space is formed in a lower portion of the commodity data reader. Furthermore, the conventional commodity data reader requires the operator 3 to work with a slight slouch fatiguing the operator 3 in the waist after a long work.

OBJECT AND SUMMARY OF THE INVENTION

It is a first object of the present invention to provide a commodity data reader capable of reading commodity data before a customer's eyes without screening commodities so that the customer is relieved from apprehensions of a wrong check-out.

It is a second object of the present invention to provide a commodity data reader capable of facilitating the operation of reading commodity data.

It is a third object of the present invention to provide a commodity data reader provided with check-out utensil storage compartments arranged so as to allow easy access of the operator to check-out utensils.

It is a fourth object of the present invention to provide a commodity data reader provided with a bar-code scanner stand having check-out utensil storage compartments to facilitate using check-out utensils.

It is a fifth object of the present invention to provide a commodity data reader provided with a bar-code scanner stand on which the operator is allowed to lean so that the physical fatigue of the operator is alleviated.

In a first aspect of the present invention, a commodity data reader comprises an elongated check-out counter on which baskets containing commodities are placed, a bar-code scanner having a scanning window, disposed near the edge of one of the longer sides of the check-out counter on the side of the operator, displays for displaying data entered in the bar-code scanner respectively to the customer and the operator, disposed near the edge of the same longer side of the check-out counter, and a data input device for entering data other than those represented by bar codes, disposed near the edge of the same longer side of the check-out counter on the side of the operator.

Such disposition of the bar-code scanner enables the customer to see both the scanning window and commodities passed across the scanning window simultaneously, which relieves the customer from apprehensions of double scanning.

In a second aspect of the present invention, a commodity data reader comprises an elongated check-out counter on which baskets containing commodities are placed, provided with check-out utensil storage compartments having openings through which check-out utensils are put into and taken out of from the check-out utensil storage compartments formed on the side facing the operator, a bar-code scanner disposed near the edge of one of the longer sides of the check-out counter on the side of the openings of the check-out utensil storage compartments with the scanning window thereof facing the customer, displays for displaying data entered in the bar-code scanner respectively to the customer and the operator, disposed near the edge of the same longer side of the check-out counter, and a data input device for entering data other than those represented by bar codes, disposed near the edge of the same longer side of the check-out counter.

All the check-out utensils can be stored in the check-out utensil storage compartments for easy access.

In a third aspect of the present invention, a commodity data reader comprises an elongated check-out counter on which baskets containing commodities are placed, provided with check-out utensil storage compartments having openings on the side facing the operator, a console disposed near the side edge of one of the longer sides of the check-out counter on the side of the operator and provided with check-out utensil storage compartments on the side facing the operator, a bar-code scanner mounted on the console with the scanning window thereof facing the customer, displays for displaying data entered in the bar-code scanner respectively to the customer and the operator, mounted on the console, and a data input device for entering data other than those represented by bar codes, mounted on the console.

The check-out utensil storage compartments are formed in the console in addition to and above those formed in the internal space of the check-out counter to provide the commodity data reader with an increased check-out utensil storing capacity. Check-out utensils which are used frequently are stored in the upper check-out utensil storage compartments to facilitate using the check-out utensils.

In a fourth aspect of the present invention, a commodity data reader comprises an elongated check-out counter on which baskets containing commodities are placed, provided with check-out utensil storage compartments having openings through which check-out utensils are put into and taken out of from the check-out utensil storage compartments on the side facing the operator, a bar-code scanner disposed near the edge of one of the longer sides of the check-out counter on the side of the operator with the scanning window thereof facing the customer and provided with a body support for supporting the operator in the belly, displays for displaying data entered in the bar-code scanner respectively to the customer and the operator, disposed near the edge of the same longer side of the check-out counter, and a data input device for entering data other than those represented by bar codes, disposed near the edge of the same longer side of the check-out counter.

The operator is able to lean on the body support of the bar-code scanner in an easy position in passing commodities across the scanning window to read the data of the commodities, so that operator's fatigue is alleviated.

BRIEF DESCRIPTION OF THE DRAWINGS

FIG. 1 is a right-hand side elevation of a commodity data reader in a first embodiment according to the present invention;

FIG. 2 is a left-hand side elevation of the commodity data reader of FIG. 1;

DETAILED DESCRIPTION OF THE PREFERRED EMBODIMENTS

Figure 8:
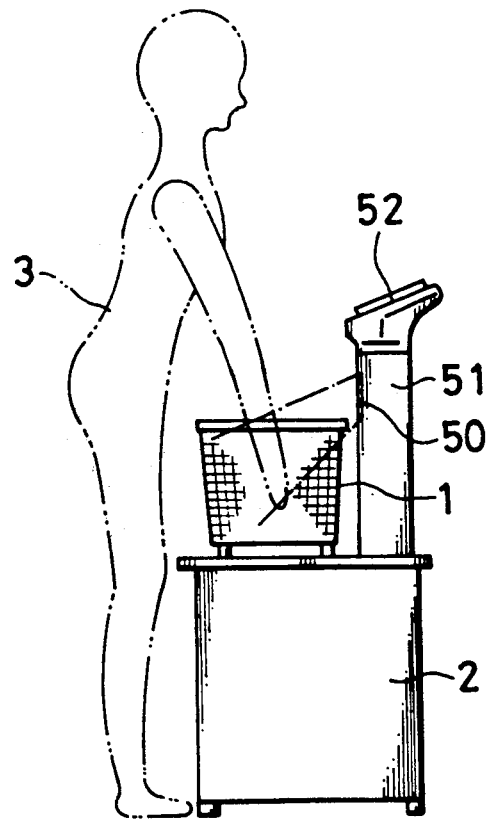
FIG. 8 is a right-hand side elevation of a conventional commodity data reader.
Figure 9:
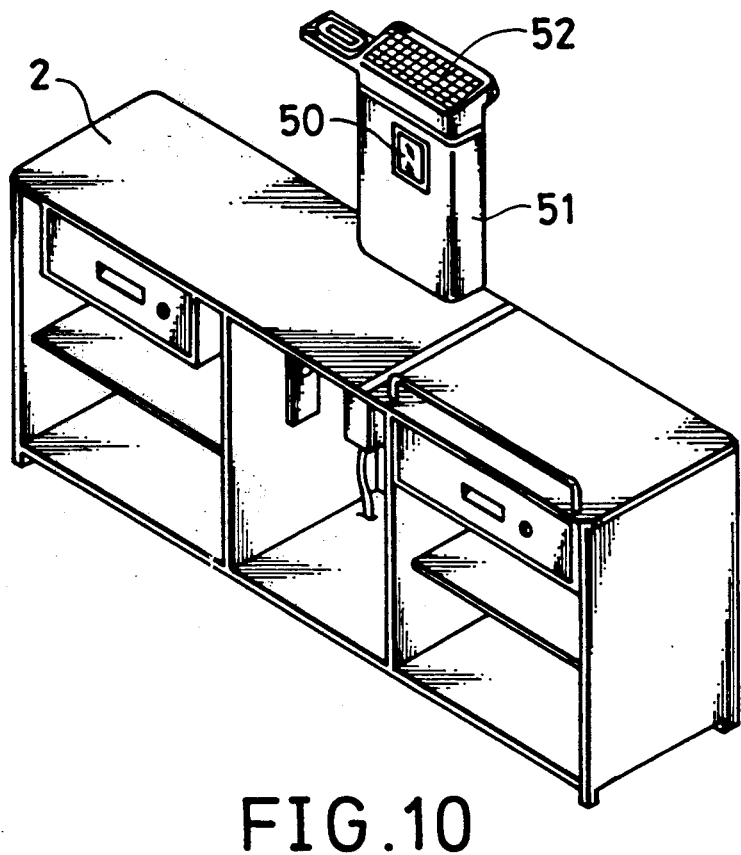
FIG. 9 is a perspective view of the commodity data reader of FIG. 8 as viewed from the side of the operator.
Figure 10:
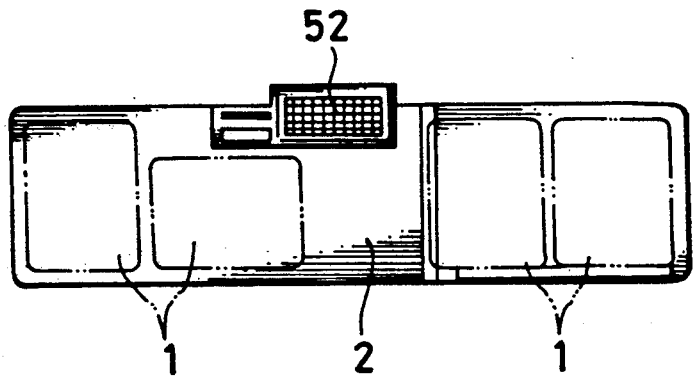
FIG. 10 is a plan view of the commodity data reader of FIG. 8.

A commodity data reader in a first embodiment according to the present invention will be described with reference to FIGS. 1 to 5, in which parts like or corresponding to those previously described with reference to FIGS. 8 to 10 are denoted by the same reference characters.

Figure 4:
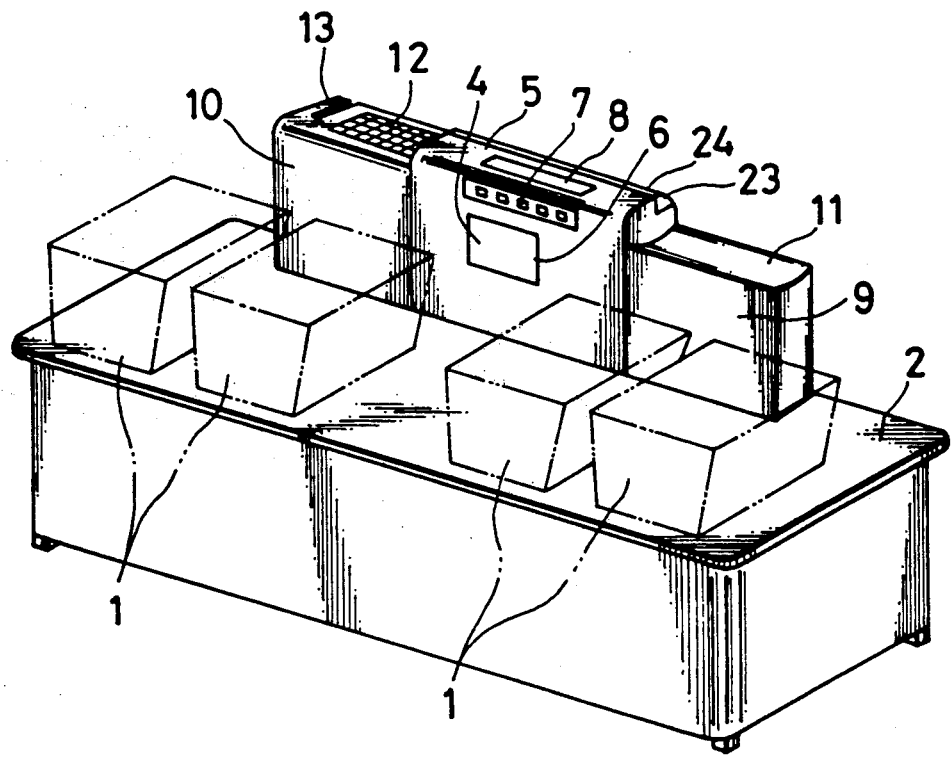
FIG. 4 is a perspective view of the commodity data reader of FIG. 1 as viewed from the side of the customer.
Figure 5:
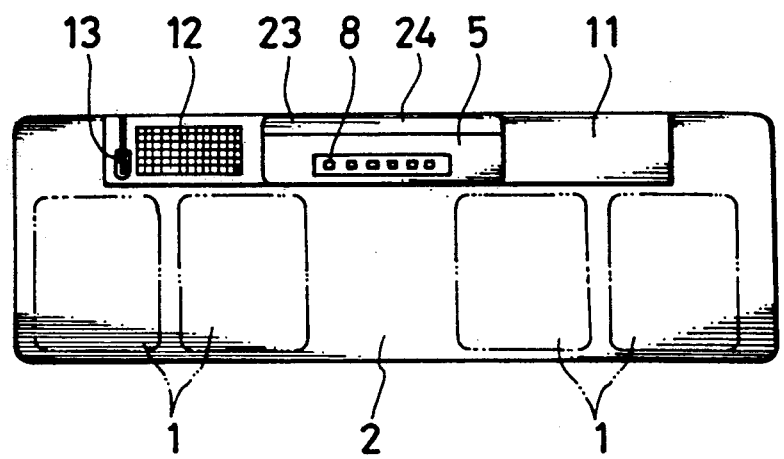
FIG. 5 is a plan view of the commodity data reader of FIG. 1.

Referring to FIGS. 1 and 2, the console 5 of a bar-code scanner 4 is formed integrally with a check-out counter 2 near the edge of the check-out counter 2 on the side of the operator 3. A scanning window 6 is formed in the console 5 on one side thereof facing the customer. As shown in FIG. 4, a display 7 for the customer is provided above the scanning window 6 on the front wall, namely, a surface facing the customer, of the console 5 of the bar-code scanner 4, and a display 8 for the operator 3 is provided on the upper wall, namely, a surface extending in a plane perpendicular to the front wall, of the console 5 of the bar-code scanner 4. The displays 7 and 8 are buried in the console 5 so that the displaying surfaces thereof are flush with the outer surface of the console 5 and nothing protrudes from the outer surface of the console 5. The check-out counter 2 is provided integrally with a left stand 9 disposed contiguously with the left-hand side of the console 5 and a right stand 10 disposed contiguously with the right-hand side of the console 5 as viewed from the side of the operator 3. The stands 9 and 10, as well as the console 5, are disposed near the edge of the check-out counter 2 on the side of the operator 3. The left stand 9 has a concave upper wall 11 for temporarily keeping coins or commodities thereon. The height of the left stand 9, and hence the height of the concave upper wall 11, is lower than the height of the upper surface of the console 5 of the bar-code scanner 4. A data input device including a keyboard 12 and a card reader 13 for entering data other than those represented by bar codes is also provided. The keyboard 12 is operated by the operator 3 to enter commodity codes and prices indicated on commodities. The card reader 13 reads data recorded on a magnetic card, such as a customer's credit card.

Figure 3:
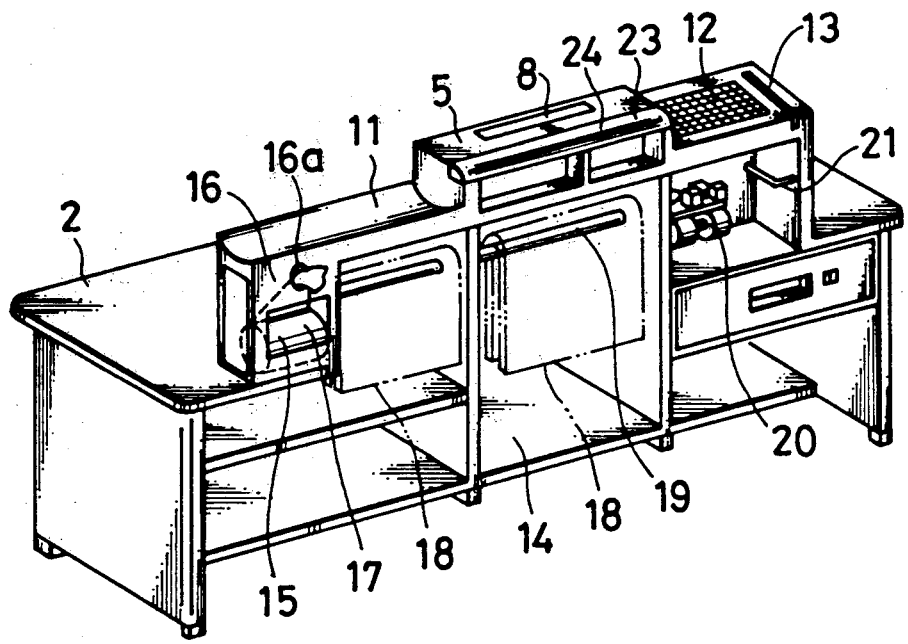
FIG. 3 is a perspective view of the commodity data reader of FIG. 1 as viewed from the side of the operator.

As shown in FIG. 3, check-out utensil storage compartments 14 opening toward the operator 3 are formed in the check-out counter 2, the console 5, stand 9 and the stand 10. Arranged in the compartments 14 from left to right, as viewed from the side of the operator 3, are a waterproof bag dispenser 17 for dispensing waterproof bags 16, having an inspection hole 15 and a take-out opening 16a, a bag hanger 19 for hanging bags 18, a tape cutter 20 and a towel hanger 21. A body support 23 for supporting the operator 3 in the belly 22 is provided in the upper portion of the console 5 of the bar-code scanner 4. The body support 23 is formed of a soft, heat insulating material and has a curved support surface 24 against which the operator 3 leans.

In checking out commodities, the customer is able to see both the scanning window 6 and commodities passed across the scanning window 6. Accordingly, the customer is relieved from apprehensions of double scanning. The disposition of the display 7 for the customer above the scanning window 6 enables the customer to recognize indications on the display 7 in the visual field including the scanning window 6 and the commodity.

The display 8 for the operator 3 buried in the upper wall of the console 5 holding the display 7 for the customer in the front wall thereof facing the customer enables the operator 3 to see an indication on the display 8 in the visual field including a commodity placed in front of the scanning window 6. Buried flush with the outer surface of the console 5, the displays 7 and 8 do not interfere with either the hands of the operator 3 or commodities in subjecting the commodities to bar-code scanning, so that the displays 7 and 8 are prevented from damages and bar-code scanning operation is facilitated.

Commodities are moved on the check-out counter 2 from the side of the stand 10 toward the side of the stand 9, namely, from right to left as viewed from the operator's side. Therefore, the operator 3 is able to operate the keyboard 12 or to insert a magnetic card in the card reader 13 with his right hand after transferring a commodity from the right hand to the left hand. Since the keyboard 12 and the card reader 13 are provided on a level below that of the upper surface of the console 5, the operator's arm rarely touches the keyboard 12 and the card reader 13 in moving commodities and hence the keyboard 12 is never operated accidentally, which improves the accessibility of the commodity data reader. Declining the keyboard 12 toward the operator 3 further improves the accessibility of the keyboard 12 and the card reader 13. The disposition of the keyboard 12 and the card reader 13 on the right-hand side of the operator 3 facilitates the operation of the keyboard 12 and the card reader 13 by a right-handed operator.

Scanned commodities are put in a basket 1 placed on the check-out counter 2 near the stand 9. Fragile commodities are stored temporarily on the concave upper wall 11 of the stand 9 to put the fragile commodities in the basket 1 after scanning bar codes put on the rest of the commodities and putting the same in the basket 1. Since the concave upper wall 11 is on a level below that of the upper surface of the console 5, the operator's arm rarely touches the commodities placed on the concave upper wall 11 in scanning the bar codes of other commodities and the scanning operation is not obstructed by the commodities placed on the concave upper wall 11. After all the commodities have been put in the basket 1, bills and coins deposited by the customer may be temporarily placed on the concave upper wall 11. Thus the concave upper wall 11 can be used for both temporarily placing commodities and temporarily placing money. The concave upper wall 11 holds commodities or money securely and facilitates grasping a plurality of coins placed thereon altogether without dropping any one of them.

The operator 3 must slouch slightly in scanning bar codes put on commodities. However, the operator 3 is not fatigued after working for a long time, because the operator 3 is allowed to lean against the body support 23 provided on the console 5. Since the body support 23 supports the operator 3 in the belly 22, namely, the central portion of the operator's body, the movement of the operator's bust is not restricted. Since the body support 23 is formed of a soft, heat insulating material and the belly 22 is soft, the operator 3 will not feel pain even if the operator 3 leans against the body support 23 for a long time, and the heat generated by the bar-code scanner 4 and the displays 7 and 9 is not transferred to the operator 3 and hence the operator 3 does not feel unpleasant.

Figure 6:
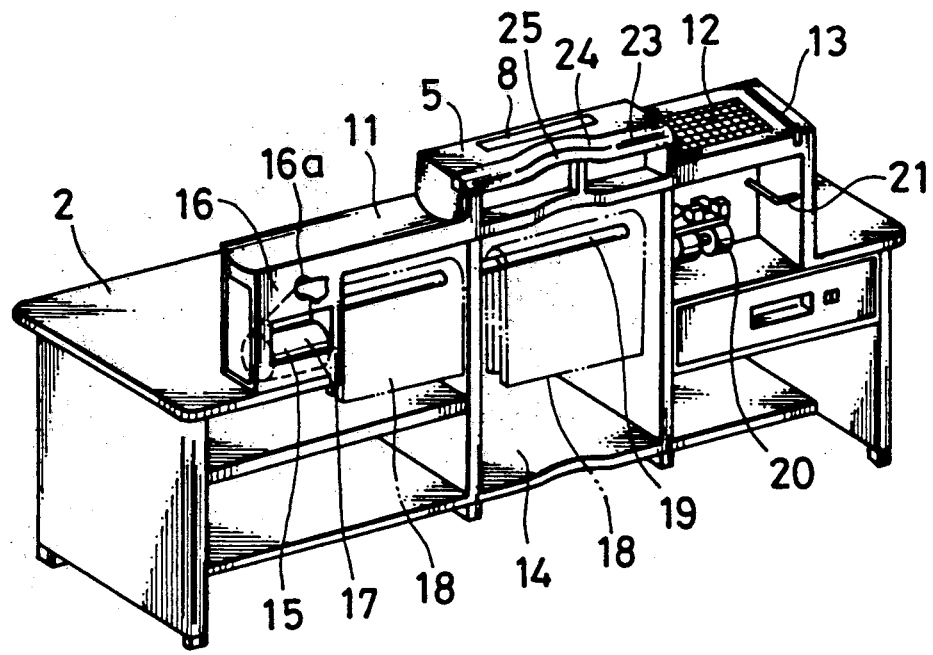
FIG. 6 is a perspective view of a commodity data reader in a second embodiment according to the present invention as viewed from the side of the operator.

A commodity data reader in a second embodiment according to the present invention will now be described hereinafter with reference to FIG. 6. The commodity data reader in the second embodiment is substantially the same in construction and function as the commodity data reader in the first embodiment, except that the commodity data reader in the second embodiment is provided with a body support 23 having a recess 25 of a size and shape snugly fitting the belly 22 of the operator 3. The recess 25 guides the operator 3 automatically to a correct working position before the console 5, so that the operator 3 is able to pass commodities across the scanning window 6 always along a correct path and to carry out the check-out work steadily.

Figure 7:
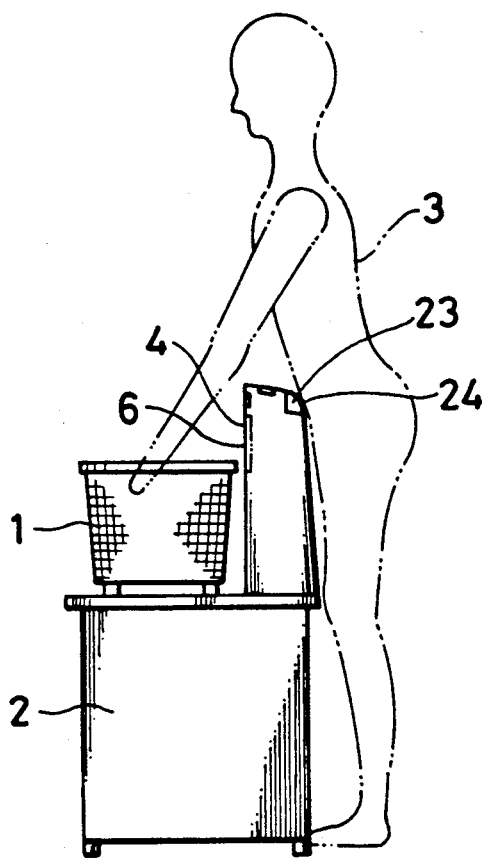
FIG. 7 is a left-hand side elevation of a commodity data reader in a third embodiment according to the present invention.

A commodity data reader in a third embodiment according to the present invention will now be described hereinafter with reference to FIG. 7, which also is substantially the same in construction and function as the commodity data reader in the first embodiment. The back surface, namely, the surface facing the operator 3, of the console 5 of the commodity data reader in the third embodiment serving also as a support for the operator 3 together with a body support 23 slopes up away from the operator 3 so that the width, namely, the size in side view, of the console 5 decreases upward. The console 5 having such a shape enables the operator 3 to lean easily against the body support 23 and to slouch slightly toward the check-out counter 2, and improves the accessibility of the commodity data reader.

What is claimed is:

1. A commodity data reader comprising an elongated check-out counter on which baskets containing commodities are placed, the improvement comprising:

a bar-code scanner having a console provided with a scanning window on the front surface thereof facing the customer, and disposed near an edge of one of the longer sides of the check-out counter on the side of the operator;

displays for displaying data entered in the bar-code scanner respectively to the customer and the operator, and disposed in said console near the edge of the same longer side of the check-out counter;

a data input device for entering data other than those represented by bar-codes, disposed in a first stand integrally formed with said console near the edge of the same longer side of the check-out counter; and a concave surface for temporarily keeping coins and commodities thereon disposed on one side of the bar-code scanner near the edge of one of the longer sides of the check-out counter on the side of the operator on a level below that of the upper surface of the console of the bar-code scanner.

2. The commodity data reader according to claim 1, further comprising:

a body support formed on an upper edge of said console on the side of the operator for supporting the operator, said body support having a recessed curvilinear contact surface to be in contact with the operator's body.

3. The commodity data reader according to any one of claims 1 or 2, wherein the display for the customer is disposed above the scanning window.

4. The commodity data reader according to any one of claims 1 or 2, wherein the display for the operator is buried in the upper surface of the console of the bar-code scanner flush with the upper surface of the console.

5. The commodity data reader according to any one of claims 1 or 2, wherein said stand containing the data input device is positioned on the check-out counter at a position upstream relative to the operator with respect to the direction of movement of commodities along the check-out counter and said stand is on a level below that of the upper surface of the console of the bar-code scanner.

6. The commodity data reader according to any one of claims 1 or 2, wherein said stand containing the data input device is disposed on the check-out counter on the right-hand side of the operator.

7. The commodity data reader according to any one of claims 1 or 2, further comprising:

utensil storage compartments for storing check-out utensils formed in a respective back surface of said check-out counter on the side of the operator.

* * * * *